United States Patent [19]

Peace

[11] Patent Number: 5,419,683

[45] Date of Patent: May 30, 1995

[54] WIND TURBINE

[76] Inventor: Steven J. Peace, 6 Chatsworth Avenue, Telscombe Cliffs, Peacehaven, East Sussex, England, BN10 7EA

[21] Appl. No.: 66,043
[22] PCT Filed: Nov. 8, 1991
[86] PCT No.: PCT/GB91/01965
   § 371 Date: May 7, 1993
   § 102(e) Date: May 7, 1993
[87] PCT Pub. No.: WO92/08893
   PCT Pub. Date: May 29, 1992

[30] Foreign Application Priority Data

Nov. 10, 1990 [GB] United Kingdom ................. 9024500

[51] Int. Cl.⁶ .......................... F03D 3/00; F03D 11/04
[52] U.S. Cl. .......................... 416/227 A; 416/DIG. 4; 416/DIG 6; 416/DIG. 8; 290/55
[58] Field of Search ........... 416/132 B, 197 A, 227 A, 416/DIG. 4, DIG. 6, DIG. 8; 415/4.2, 4.4, 907; 290/44, 55

[56] References Cited

U.S. PATENT DOCUMENTS 4,031,173  6/1977  Rogers .
4,047,833  9/1977  Decker .................................. 290/55
4,208,168  6/1980  Chen et al. .
4,264,279  4/1981  Dereng .......................... 416/227 A

FOREIGN PATENT DOCUMENTS 3106777  9/1982  Germany .
   5177  1/1988  Japan ............................. 416/DIG. 8
1257276  9/1986  U.S.S.R. ....................... 416/DIG. 8

Primary Examiner—Edward K. Look
Assistant Examiner—James A. Larson
Attorney, Agent, or Firm—Senniger, Powers, Leavitt & Roedel

[57] ABSTRACT

A wind turbine for mounting on an existing industrial chimney (1), tower or the like, includes two vertically aligned blades (3) mounted on rotor arms (2) for rotation about the longitudinal axis of the chimney, tower or the like. The rotor arms are supported from an annular structure (8) secured to the outer circumference of the chimney, tower or the like and include at their radially innermost ends a rotor arm ring (11) which cooperates with the annular support structure to enable the rotor arms and blades to rotate about the chimney, tower or the like under the influence of wind pressure. Drive ring (16) carried by one or each rotor arm (2) are connectable to gearing of one or more power generators (9) positioned within or extended to the chimney, tower or the like.

2 Claims, 7 Drawing Sheets

WIND TURBINE

BACKGROUND OF THE INVENTION

This invention relates to wind turbines and more especially to wind turbines having rotors mounted for rotation about vertical axes and capable of being mounted on or to an existing industrial chimney, concrete tower or similar structure.

Vertical axis wind turbines have fixed geometry blades and enjoy several advantages over more conventional wind turbines having variable geometry blades, these including eliminating the need for a yaw control system and lower design and manufacturing costs.

Several designs of vertical axis wind turbines are known and have been employed to generate electricity. These known machines have been mounted on specially designed and built towers and include either a gear box and power generator mounted within the structure of the respective tower or in a plant room located at the tower base with a connecting drive shaft to the rotor arm of the turbine. Existing wind turbines are relatively expensive to construct largely due to the high civil engineering cost of the tower. As larger and more powerful wind turbines are developed, so more expensive towers will need to be built to support them. Furthermore the power output of such known wind turbines is limited.

SUMMARY OF THE INVENTION

In one aspect, the present invention provides a vertical axis wind turbine which is capable of being mounted on or to an existing industrial chimney, tower or similar structure.

Accordingly the present invention provides a wind turbine mounted on an existing industrial chimney, tower or the like. The wind turbine comprising two vertically aligned blades mounted on rotor arms for rotation about the longitudinal axis of the chimney, tower or the like, the rotor arms being supported from an annular structure secured to the outer circumference of the chimney, tower or the like and including at their radially innermost ends tracking means which cooperate with complementary tracking means of the annular support structure to enable the rotor arms and blades to rotate about the chimney, tower or the like under the influence of wind pressure, and drive means carried by one or each rotor arm connectable to gearing of one or more power generators positioned within or extended to the chimney, tower or the like.

The turbine unit may comprise a single module secured around the circumference or on top of a chimney, tower or similar structure: alternatively two or more modules maybe mounted around the chimney circumference, tower or similar structure at a lower level.

Each such module may consist of a segmental framework manufactured from a high strength material such as steel, this framework being attached onto or around the circumference of an existing chimney, tower or similar structure. Rotor arms and blades of the or each turbine unit may be carried by a ring mounted for rotation about the tower circumference. The ring may be supported on rollers, bearings or the like forming parts of a track carried by the framework. On the inside of the rotor arm ring may be secured a gear ring located around the whole circumference of the rotor arm ring. The drive for the or each gear box and generator may be taken from the gear ring.

The exterior of the framework may be enclosed with a cladding material to protect the assembly and to provide a smooth rounded surface which offers less wind resistance.

The power output of the turbine unit is related to the size and type of chimney, tower or similar structure employed because the structural design of each chimney. tower or similar structure determines inter alia the power and weight of the turbine unit which can be supported.

On power station chimney's built from the 1960's onwards consisting of a multi-flue chimney with a concrete shell, a large unit having two or more gear boxes and power generator sets mounted around the chimney periphery maybe provided, each generator set being capable of developing around 1 MW of power output. The gear box drives of such units may be declutched from the main drive depending on the wind speed and power output required.

The generator sets may be of varying power outputs and mounted in diagonally approved pairs to enable the power output to be kept at its optimum by engaging or disengaging individual generator sets from the main drive as the wind speed varies. Using this type of power control a speed related brake may not be necessary: however, a parking brake may be required to allow maintenance work to be carried out. It is envisaged that this method of clutching and declutching would be controlled automatically via wind speed indicator and a small computer. They may also be taken out of drive for repair and planned maintenance.

Alternatively on a smaller steel chimney, say 5' diameter and 100' high, a scaled down unit may be fabricated onto an extra section which maybe incorporated in or added onto the existing chimney structure. The small unit however may not have gear boxes or generators housed within the module, but may have a drive shaft running down the outside of the chimney to a plant room at its base.

The framework and the drive ring may be fixed via shock absorbing rubber blocks or the like depending on the predicted lateral forces to be exerted in the tower. This type of vertical axis wind turbine may not be suitable for brick or glass reinforced plastics chimneys, towers or similar structures.

The rotor arms and or blades may be designed and manufactured using existing technology. Alternatively, due to their size they may be produced as a lattice framework from a relatively light weight alloy, carbon fibre or similar material. The rotor arms and/or blades may be produced in sections for ease of erection and tensioning cables maybe employed to assist their assembly.

Tensioning cables may be employed to enhance rigidity of the structure. Alternatively, suspension guys maybe used via a strut mounted close to the turbine unit. Indeed any conventional means of support may be used. The rotor arms and or blades may also be clad with aluminium, fibre glass, fabric or similar material to increase their resistance to damage due for example, to inclement weather. Means may be provided to feather the blades.

Maintenance and erection of the turbine units, rotor arms and blades may be carried out as follows. The chimney or tower on which a module is to be mounted maybe used as a derrick when erecting the module or modules and rotor arms. The blades may be winched up from the ends of the respective rotor arms simultaneously. In the event that a blade needs replacing or removal, a counter weight maybe winched up as the blade is lowered. A locking device maybe fitted to the rotor arm ring within the module to prevent rotation of the rotor arms and blades during maintenance. The rotor arms and blades may have access tunnels along them to allow inspections and maintenance to be carried out.

Specific embodiments of the invention will now be described by way of example with reference to the accompanying drawings in which:

DETAILED DESCRIPTION OF THE PREFERRED EMBODIMENTS

In the embodiments illustrated in FIG. 1 to 4, a pair of vertically aligned blades 3 are caused to rotate about a vertical axis around a chimney 1 by the wind. The blades 3 are supported on rotor arms 2 forming part of a turbine module 4. The rotor arms 2 and blades 3 are fabricated into lattice frame sections and are preferably manufactured from a light weight material such as carbon fibre tube. Tensioning cables may be run along the inside of the frame to provide enhanced rigidity. The blades may be attached to the respective rotor arm by hinged flanges to allow the blades to be folded downwardly under the respective arm during erection. A boiler house is shown at 5.

Figure 1:
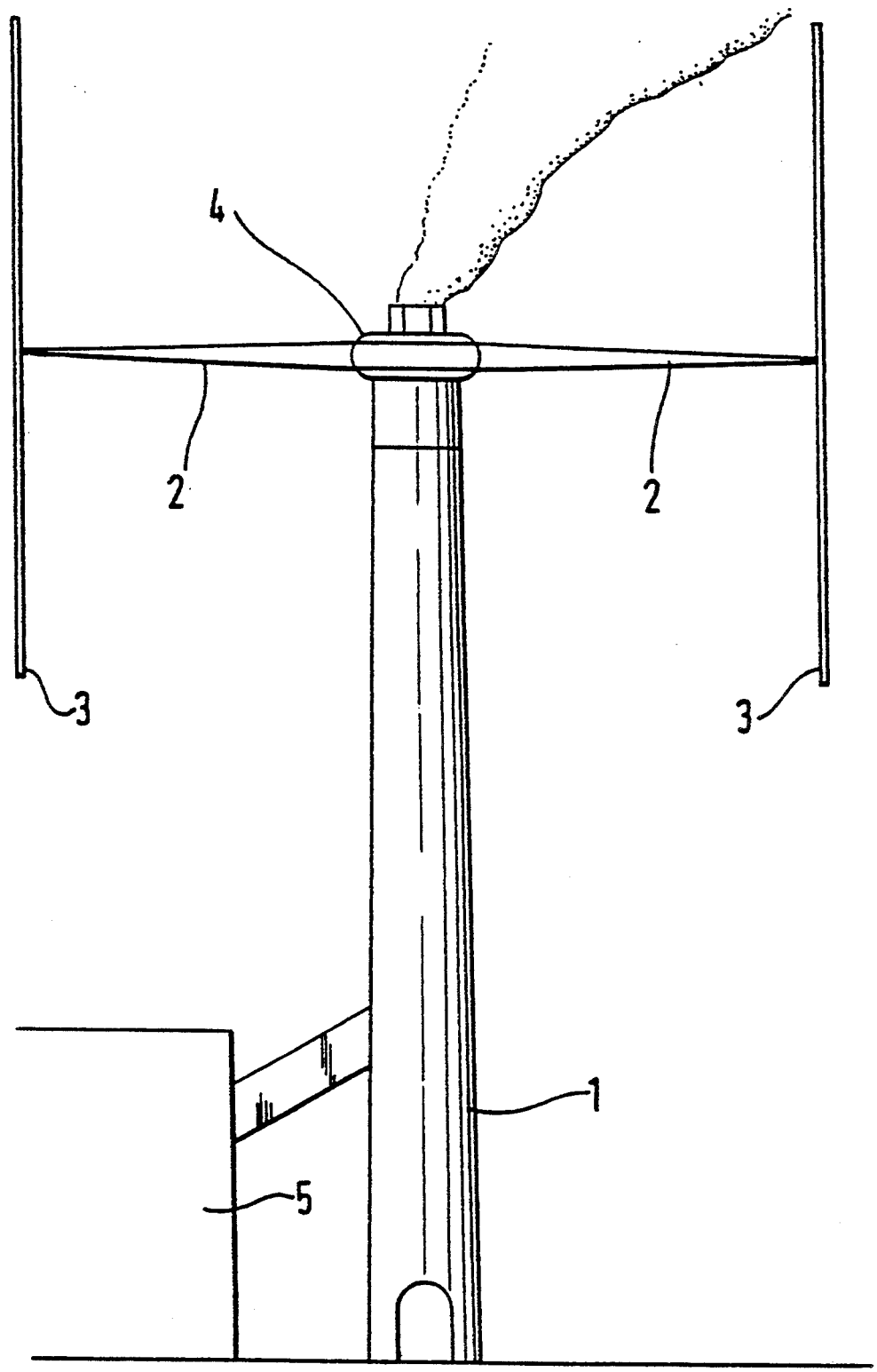
FIG. 1 is a side view of a single module wind turbine in accordance with the invention mounted on the top of a chimney.
Figure 2:
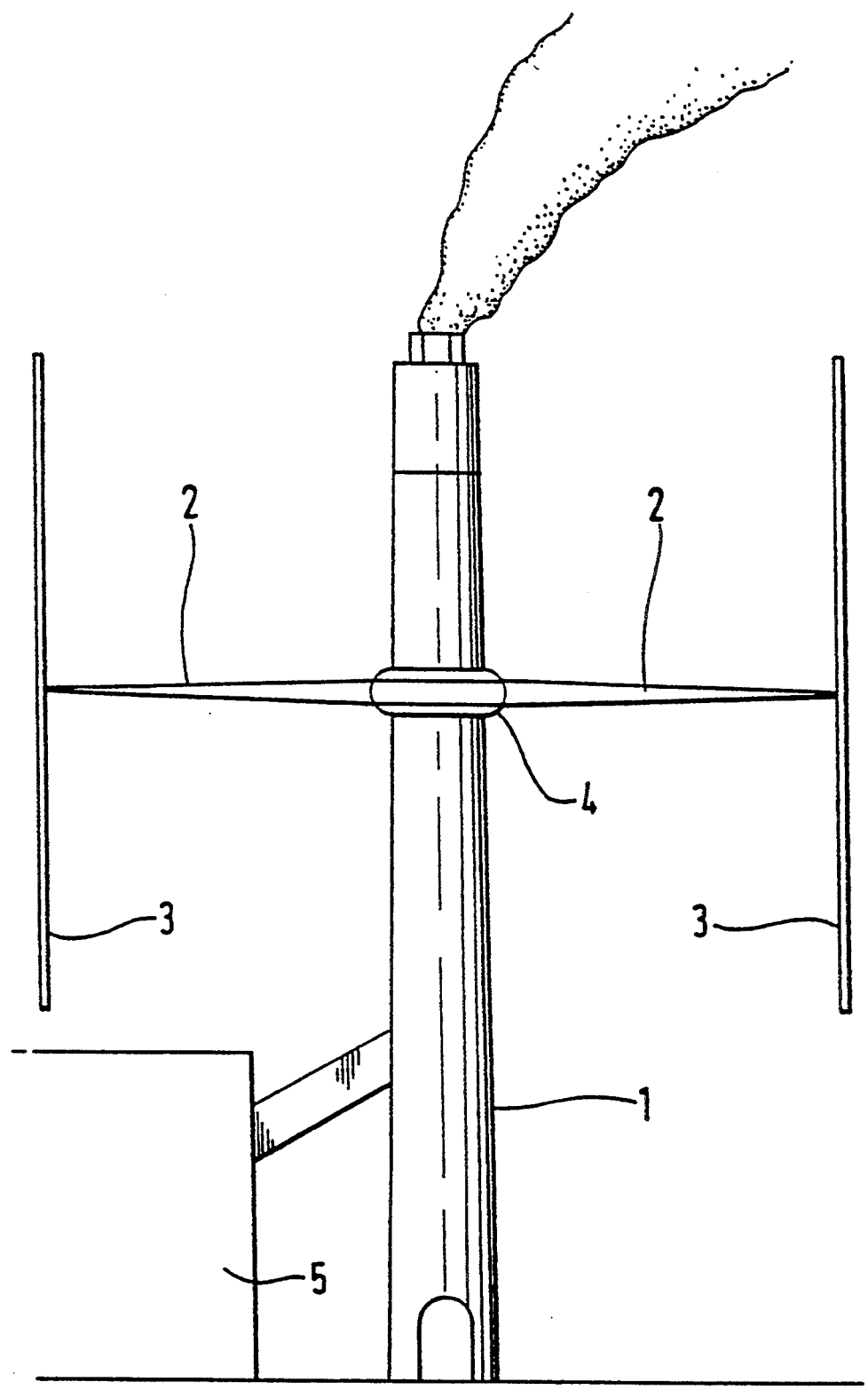
FIG. 2 is a side view of a single module wind turbine mounted lower down a chimney and fixed around its whole circumference.
Figure 3:
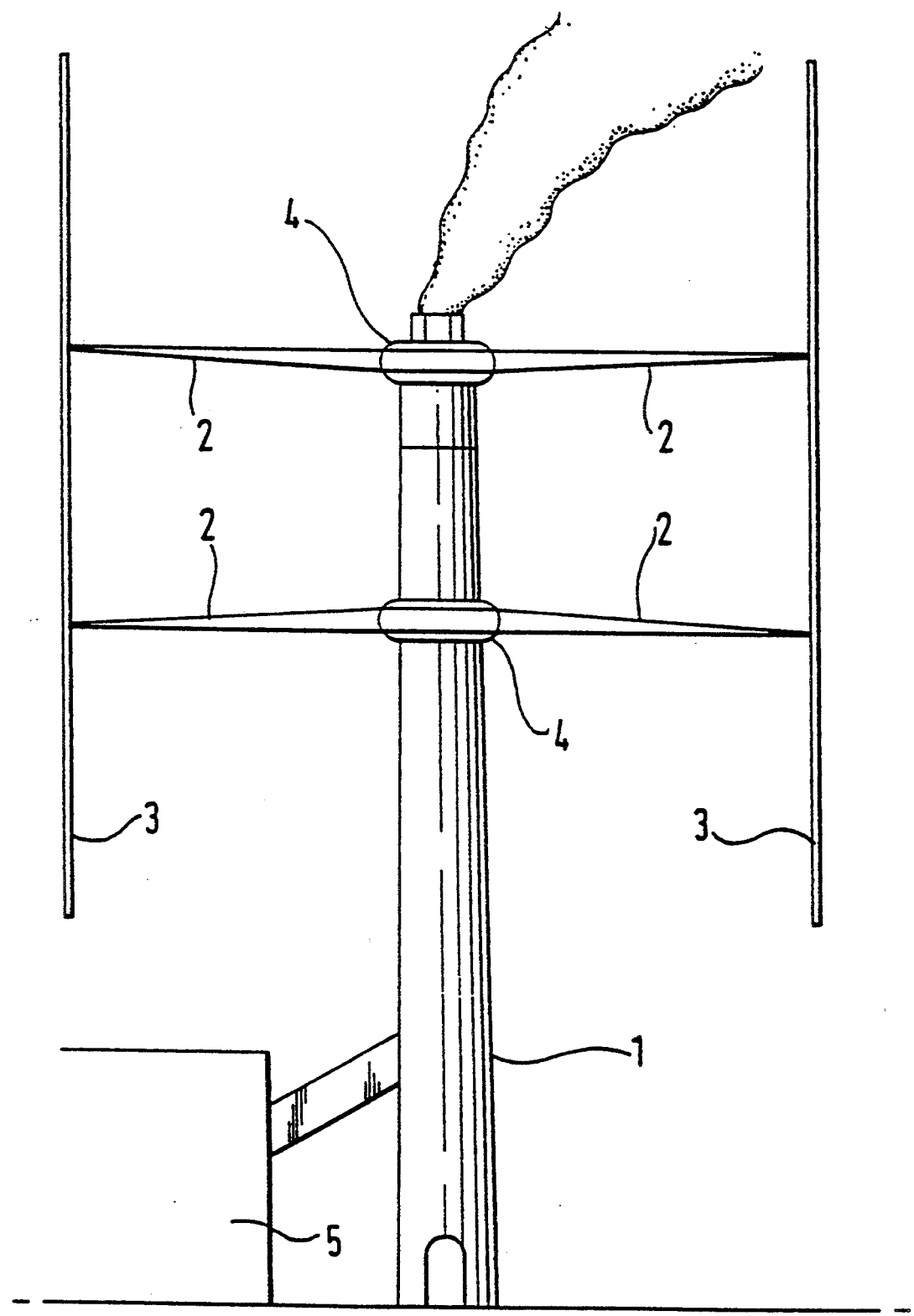
FIG. 3 is a side view of a double module wind turbine mounted at the top and at a lower level.
Figure 4:
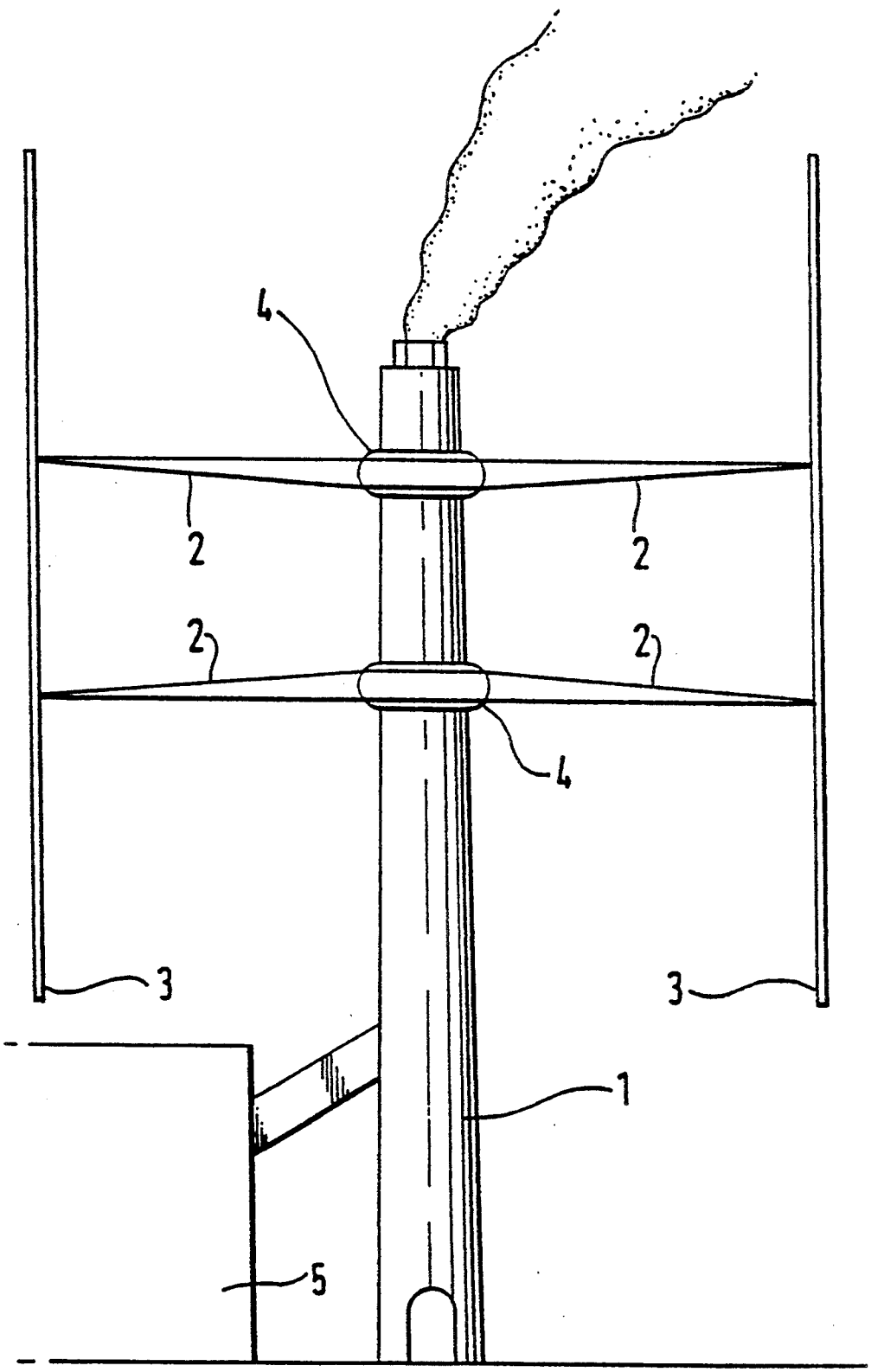
FIG. 4 is a side view of a double module wind turbine with both modules mounted at a lower level.
Figure 5:
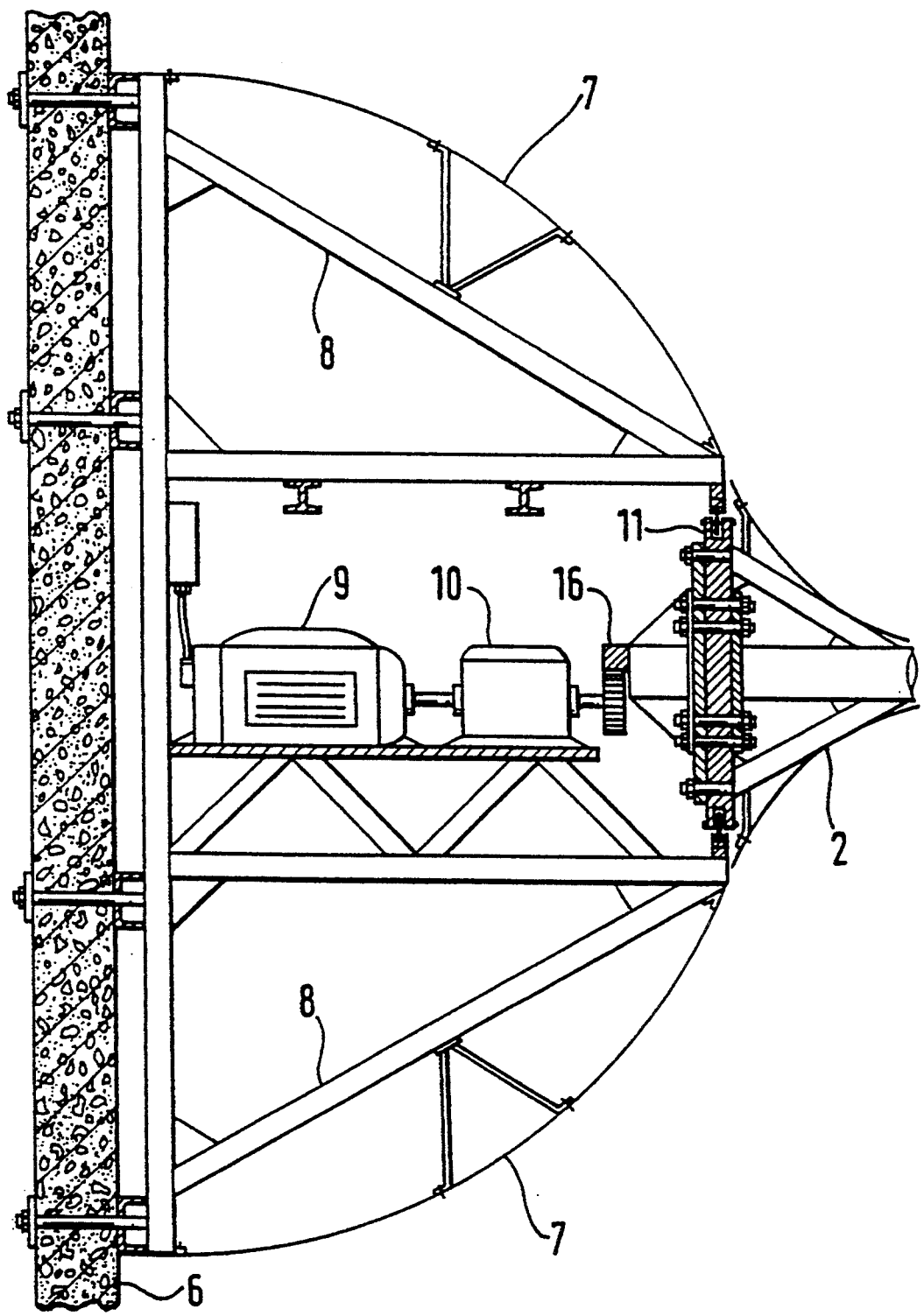
FIG. 5 is a side view in section of one of the modules illustrated in FIGS. 1 to 4 with its framework, rotor arm ring, drive ring and a gear box and generator set.
Figure 6:
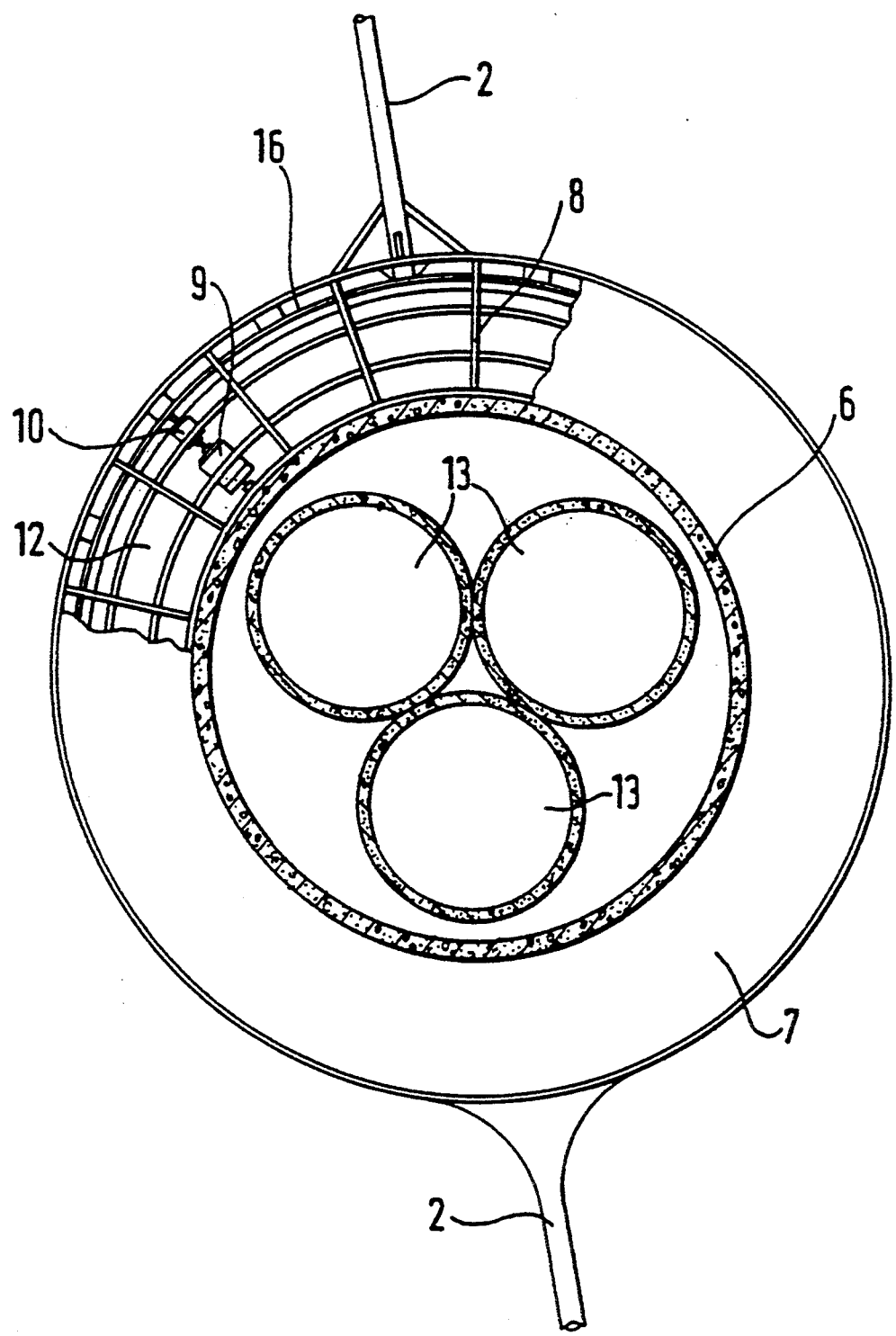
FIG. 6 is a plan view partly in section of one of the modules illustrated with one quarter of the cladding cut away to reveal the framework, rotor arm ring, drive ring and a gear box and generator set.

The modules are illustrated in greater detail in FIGS. 5 and 6. The module includes a steel lattice-like framework 8 attached to a concrete shell 6 of the chimney. Contained within the module and mounted on a floor 12 are a generator 9 and a gear box 10. Reinforced concrete rings may be moulded around the structure to provide added strength and support for the floor 12. The gear box 10 takes its drive from a drive ring 16 (broadly, "drive means") which in turn is attached to a rotor arm ring 11 (broadly, "drive means"). The rotor arm ring 11 is connected by means of rollers, bearings or the like to the radially outer extents of the frame 8. The rotor arms 2 are attached to the rotor arm ring 11. The entire outer surface of the module is covered with cladding 7 to protect the framework and plant from the elements and to offer less wind resistance. Chimney flues 13 are illustrated in FIG. 6.

Details of the rotor arms and blades are not illustrated these being generally conventional. The fixings holding the frame 8 to the shell 6 and the drive ring 16 to the rotor arm ring 11 may have to be fixed via shock absorbing rubber blocks or similar shock absorbing device or material depending on the lateral force exerted.

Figure 7:
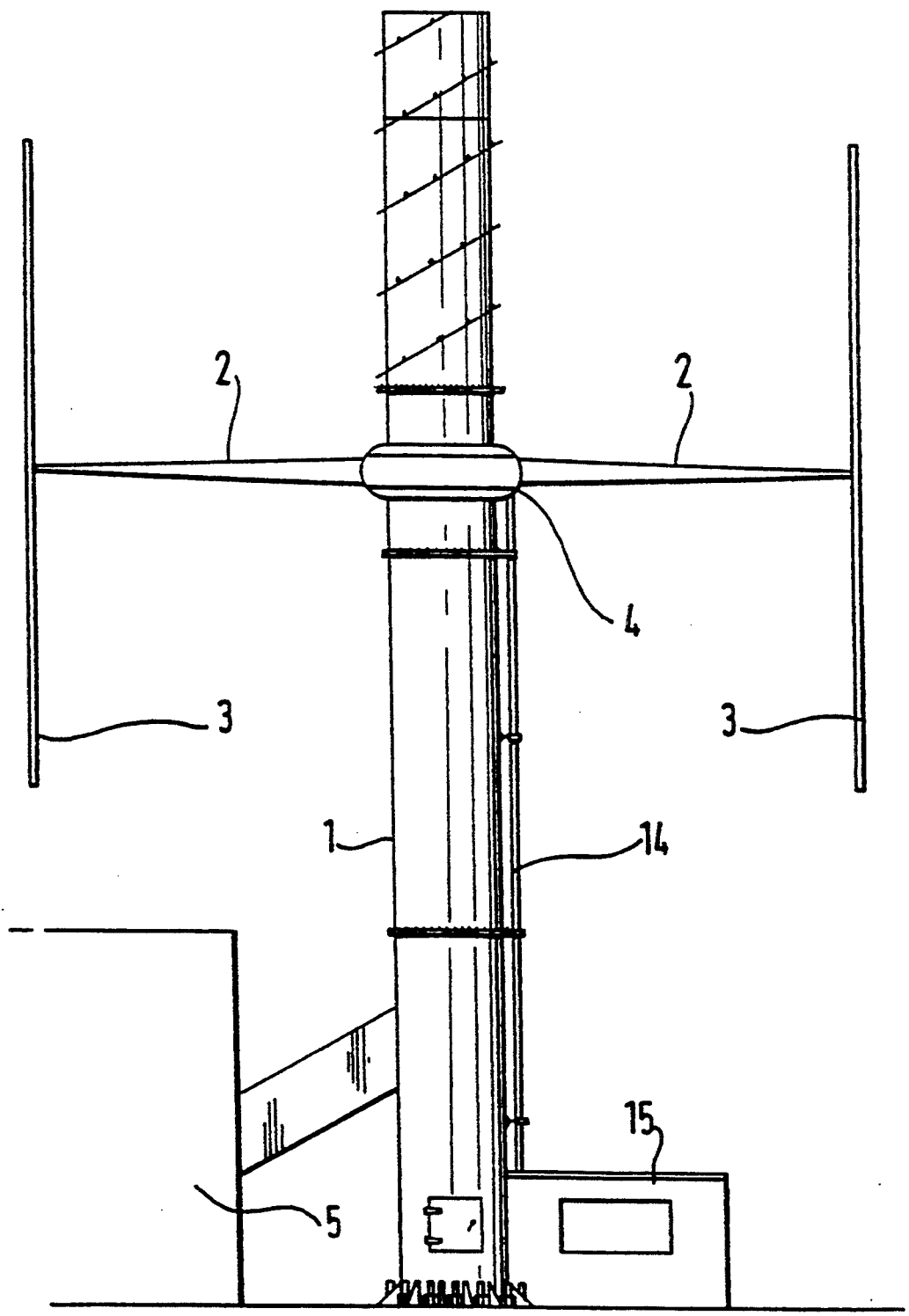
FIG. 7 is a side view of a smaller version of the module wind turbine fabricated into an extra section and incorporated in a steel chimney, this Figure also showing a drive shaft running down the outside of the chimney and the plant room at its base.

In the embodiment illustrated in FIG. 7 the drive shaft is shown as reference numeral 14 and the plant room shown as 15.

On large machines, with, for example, four sets of blades and rotor arms, it may be necessary to connect the outer most tips of the rotor arms with cables or struts to prevent excessive sideways oscillation.

It is believed that wind turbines as described will be capable of generating at least 9 to 10 megawatts when operating at their design capacity.

Calculations carried out show the retro-fitting of a wind turbine in accordance with the invention would be generally satisfactory.

It is believed that wind turbines in accordance with the invention will not only be cheaper to manufacture and potentially more powerful than any existing machine, but will be easy to erect and maintain, easy to connect to the grid, more adaptable and more acceptable to the environment. Such wind turbines can also be fitted to almost any large existing structure. Large machines could be assembled by simply adding additional frames and sections of blade and rotor arm.

It is to be understood that the embodiments described and illustrated are merely exemplary of vertical axis wind turbine units in accordance with the invention and that modifications can be made there to without departing from the true scope of the invention. Thus, whereas the units disclosed include a pair of blades, units including more than two blades can be employed. Thus a unit may include two pairs of blades, the blades of each pair being positioned are opposite the other.

I claim:

1. A vertical axis wind turbine in combination with an existing industrial tower on which it is mounted, the wind turbine comprising:

an annular turbine module secured to the circumference of the industrial tower and comprising drive means connected via gearing to a generator and a steel lattice framework which supports at its outermost end opposed annular guideways;

two horizontally aligned rotor arms supported by the turbine module and connected to the drive means thereof, the rotor arms carrying bearing members, the bearing members tracking in the opposed annular guideways of the module;

two vertically aligned blades of fixed geometry secured one to the outermost end of each horizontally aligned rotor arm; and means carried by each rotor arm at its innermost end for mounting the rotor arm on the turbine module, said mounting means being connected to said drive means to enable the rotor arms and blades supported thereby to rotate about the industrial tower under the influence of wind pressure.

2. A vertical axis wind turbine and industrial tower as claimed in claim 1 wherein the external surface of the steel lattice framework is substantially enclosed within a cladding material to present a substantially rounded surface to minimize wind resistance.

* * * * *